United States Patent
Huh (10) Patent No.: US 10,919,527 B2
(45) Date of Patent: Feb. 16, 2021

(54) INERTIAL DRIVING GUIDE APPARATUS AND CONTROL METHOD

(71) Applicants: Hyundai Motor Company, Seoul (KR); Kia Motors Corporation, Seoul (KR)

(72) Inventor: Jee Wook Huh, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 200 days.

(21) Appl. No.: 16/174,936

(22) Filed: Oct. 30, 2018

(65) Prior Publication Data

US 2019/0202456 A1     Jul. 4, 2019

(30) Foreign Application Priority Data

Dec. 28, 2017   (KR) ........................ 10-2017-0182230

(51) Int. Cl.
    *B60W 30/16*        (2020.01)
    *G01C 21/16*        (2006.01)
                 (Continued)

(52) U.S. Cl.
    CPC .......... *B60W 30/162* (2013.01); *B60W 50/00* (2013.01); *G01C 21/16* (2013.01);
                       (Continued)

(58) Field of Classification Search
    CPC ............... B60W 30/162; B60W 50/00; B60W 2554/801; B60W 2554/804; B60W 20/00;
                     (Continued)

(56) References Cited

U.S. PATENT DOCUMENTS

2008/0078600 A1*   4/2008   Inoue ................. B60K 31/0066
                                                     180/170
2015/0266478 A1*   9/2015   Takahashi ............ B60W 30/16
                                                      701/22

(Continued)

FOREIGN PATENT DOCUMENTS

| JP | 2012-116428 A | 6/2012 |
| JP | 2016-161532 A | 9/2016 |

(Continued)

*Primary Examiner* — Mary Cheung
(74) *Attorney, Agent, or Firm* — Mintz Levin Cohn Ferris Glovsky; Peter F. Corless (57) ABSTRACT

An inertial driving guide apparatus and a control method control an inertial driving traveling guide apparatus to change a driving setting for inertial driving if a preceding vehicle is present when an inertial driving guide is provided. The inertial driving guide apparatus includes: a navigation system that outputs a traveling route according to input of a destination of a current vehicle; and a controller for providing the inertial driving guide for the current vehicle according to current traveling road conditions depending on the input route, such that if a preceding vehicle is present in front of the current vehicle when the inertial driving guide for the vehicle is provided, the controller is configured to compare vehicle information on the preceding vehicle with vehicle information on the current vehicle and to change a driving setting for inertial driving of the current vehicle.

10 Claims, 3 Drawing Sheets

(51) Int. Cl.
*G01C 21/20* (2006.01)
*B60W 50/00* (2006.01)
*G01C 21/26* (2006.01)
*B60K 6/20* (2007.10)
*B60W 20/00* (2016.01)

(52) U.S. Cl.
CPC .............. *G01C 21/20* (2013.01); *G01C 21/26* (2013.01); *B60K 6/20* (2013.01); *B60W 20/00* (2013.01); *B60W 2050/0008* (2013.01); *B60W 2554/801* (2020.02); *B60W 2554/804* (2020.02); *B60Y 2200/92* (2013.01); *B60Y 2400/61* (2013.01)

(58) Field of Classification Search
CPC ..... B60W 2050/0008; B60W 50/0097; B60W 2030/1809; B60W 2050/146; B60W 2556/50; B60W 30/18072; B60W 50/14; B60W 30/00; B60W 40/105; G01C 21/26; G01C 21/16; G01C 21/20; B60Y 2400/61; B60Y 2200/92; B60K 6/20; G05D 1/027; G05D 1/0223
See application file for complete search history.

(56) References Cited

U.S. PATENT DOCUMENTS

| | | | |
|---|---|---|---|
| 2016/0016469 A1* | 1/2016 | Yamada | B60W 30/17 701/22 |
| 2016/0091315 A1* | 3/2016 | Oguri | G01C 21/165 701/408 |
| 2017/0066444 A1* | 3/2017 | Habu | B60W 30/12 |
| 2018/0162392 A1* | 6/2018 | Takaki | G01S 13/867 |
| 2019/0071075 A1* | 3/2019 | Mimura | G08G 1/16 |

FOREIGN PATENT DOCUMENTS

| | | |
|---|---|---|
| JP | 6106758 B2 | 4/2017 |
| KR | 10-2009-0062520 A | 6/2009 |
| KR | 10-2016-0071989 | 6/2016 |

* cited by examiner

INERTIAL DRIVING GUIDE APPARATUS AND CONTROL METHOD

CROSS-REFERENCE TO RELATED APPLICATION

This application claims under 35 U.S.C. § 119(a) the benefit of Korean Patent Application No. 10-2017-0182230 filed on Dec. 28, 2017, the entire contents of which are incorporated herein by reference.

BACKGROUND

(a) Technical Field

The present disclosure relates to an inertial driving guide apparatus and a control method thereof, more particularly, to the inertial driving guide apparatus configured to change a driving setting for inertial driving of a current vehicle in consideration of vehicle information on a preceding vehicle and vehicle information on the current vehicle if the preceding vehicle is present when an inertial driving guide is provided.

(b) Description of the Related Art

A system for a hybrid vehicle includes an engine and a motor as vehicle driving sources, and includes an inverter, a DC/DC converter and a high-voltage battery for operations of the engine and the motor, and further includes a hybrid control unit (HCU), a motor control unit (MCU) and a battery management system (BMS).

The high-voltage battery is an energy source for driving the motor and the DC/DC converter of the hybrid vehicle, and the BMS is a controller of the high-voltage battery that monitors the voltage, current and temperature of the high-voltage battery to control the state of charge (SOC) [%] of the high-voltage battery.

It is known that main driving modes of a hybrid vehicle on the basis of the aforementioned configuration include an electric vehicle mode using only motor power and a hybrid electric vehicle mode that is an auxiliary mode using torque of the engine as main power and using torque of the motor as auxiliary power. The hybrid electric vehicle mode includes a regenerative braking (RB) mode of collecting braking and inertial energy of a vehicle through generation in the motor and charging the energy in a battery during braking of the vehicle or inertial driving.

Further, with the recent advent of plug-in hybrid vehicles, vehicles driven using a Charge-Depleting (CD) driving mode that causes consumption of battery SOC and a Charge-Sustaining (CS) driving mode for maintaining battery SOC have been developed.

On the other hand, in the case of plug-in hybrid vehicles, control strategies for improving vehicle fuel efficiency using creep torque in a traveling stage have been researched. A plug-in hybrid vehicle includes a guide apparatus for controlling inertial driving by setting a route through a navigation system and has a configuration for providing an inertial driving guide on a vehicle traveling route.

Accordingly, the inertial driving guide apparatus is configured to provide the inertial driving guide on a traveling route that requires inertial driving and to control a vehicle speed using creep torque when a driver releases an accelerator pedal.

Figure 1:
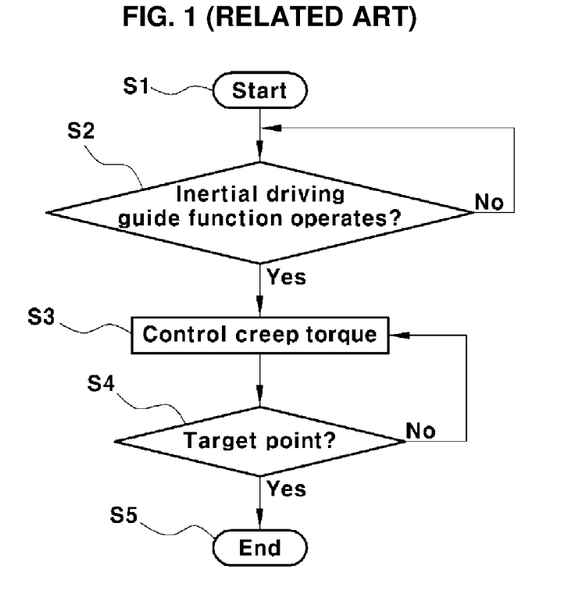
FIG. 1 (RELATED ART) is a flowchart illustrating a conventional inertial driving control method through an inertial driving guide function.

FIG. 1 (RELATED ART) illustrates a conventional control method of starting a logic according to input of a traveling route (S 1), providing inertial driving guide (S2), controlling the speed of a vehicle through creep torque control (S3), and ending the logic (S5) when the corresponding vehicle arrives at a target point (S4).

However, the conventional method has a problem that a target point and a target vehicle speed which are set according to an inertial driving guide are maintained even when a preceding vehicle is present on a traveling route that requires the inertial driving guide, and thus a driver needs to rapidly reduce speed.

SUMMARY

The present disclosure provides an inertial driving guide apparatus for changing a driving setting for inertial driving of a current vehicle when a preceding vehicle is present.

In addition, another object of the present disclosure is to provide a technique of performing an inertial driving guide function in consideration of vehicle behavior when a preceding vehicle is present.

Further, another object of the present disclosure is to provide an inertial driving guide apparatus for performing inertial driving without brake input when a preceding vehicle is present.

An inertial driving guide apparatus and a control method thereof to accomplish the aforementioned objects of the present disclosure include the following configurations.

The present disclosure provides an inertial driving guide apparatus including: a navigation system configured to output a traveling route according to input of a destination of a current vehicle; and a controller for providing an inertial driving guide for the current vehicle according to current traveling road conditions depending on the input route, such that if a preceding vehicle is present in front of the current vehicle when the inertial driving guide for the current vehicle is provided, the controller is configured to compare vehicle information on the preceding vehicle with vehicle information on the current vehicle and to change a driving setting for inertial driving of the current vehicle.

In addition, the vehicle information on the preceding vehicle, measured by the controller, may include a distance between the current vehicle and the preceding vehicle and the speed of the preceding vehicle.

In addition, the driving setting may include a target point and a target vehicle speed set for the inertial driving guide.

In addition, the controller may change the speed of the current vehicle according to the changed driving setting by controlling creep torque.

In addition, the controller may perform feedback control in order to control the creep torque.

In addition, the controller may change the driving setting when a relative speed of the current vehicle and the preceding vehicle is less than a preset value.

Further, there is provided an inertial driving guide control method including: outputting a traveling route when a destination of a current vehicle is input to a navigation system; determining whether an inertial driving guide for the current vehicle along the traveling route is required; determining whether there is a preceding vehicle in front of the current vehicle when the inertial driving guide for the current vehicle is required; comparing vehicle information on the preceding vehicle with vehicle information on the current vehicle when there is the preceding vehicle in front of the current vehicle; and changing a driving setting for inertial driving of the current vehicle when a result of comparison between the vehicle information on the current vehicle and the vehicle information on the preceding vehicle is less than a comparison value preset in a controller.

In addition, the vehicle information on the preceding vehicle includes a distance between the current vehicle and the preceding vehicle and the speed of the preceding vehicle.

In addition, the driving setting may include a target point and a target vehicle speed set for the inertial driving guide.

In addition, the controller may change the speed of the current vehicle according to the changed driving setting by controlling creep torque.

In addition, the controller may perform feedback control in order to control the creep torque.

In addition, in the comparing of the vehicle information on the preceding vehicle with the vehicle information on the current vehicle when the preceding vehicle is present, the driving setting is changed when a relative speed of the current vehicle and the preceding vehicle is less than the preset value.

The present disclosure can obtain the following effects according to combinations and relation of the above-mentioned embodiments with configurations which will be described below.

The present disclosure provides an inertial driving guide apparatus capable of increasing the frequency of inertial driving.

In addition, the present disclosure improves vehicle fuel efficiency by increasing the frequency of inertial driving.

Further, the present disclosure can provide an inertial driving guide and control by changing a logic without adding a mechanical configuration to provide remarkable economic effects.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, the exemplary embodiments of the present disclosure will be described in detail with reference to the accompanying drawings. The exemplary embodiments of the present disclosure may be modified in many different forms, and the scope of the present disclosure should not be construed as being limited to the following embodiments. These exemplary embodiments are provided so that this disclosure will be through and complete and will fully convey the scope to those skilled in the art.

The present disclosure relates to an inertial driving guide apparatus and a control method thereof by which a route is set on the basis of target information input to a navigation system 100, vehicle information of a preceding vehicle is compared with vehicle information of a current vehicle when the preceding vehicle is present on the set route, and a driving setting for inertial driving is changed when a value indicating the comparison result is equal to or greater than a value preset in a controller 200.

A hybrid vehicle system disclosed in the present disclosure includes an engine, a motor and a transmission as vehicle driving sources 300, includes an inverter, a DC/DC converter and a high-voltage battery for operations of the engine, the motor and the transmission, and includes a hybrid control unit (HCU), a motor control unit (MCU) and a battery management system (BMS) as control means.

The high-voltage battery is an energy source for driving the motor and the DC/DC converter of the hybrid vehicle, and the BMS, which is a controller of the high-voltage battery, monitors the voltage, current and temperature of the high-voltage battery to control the state of charge (SOC) [%] of the high-voltage battery.

Figure 2:
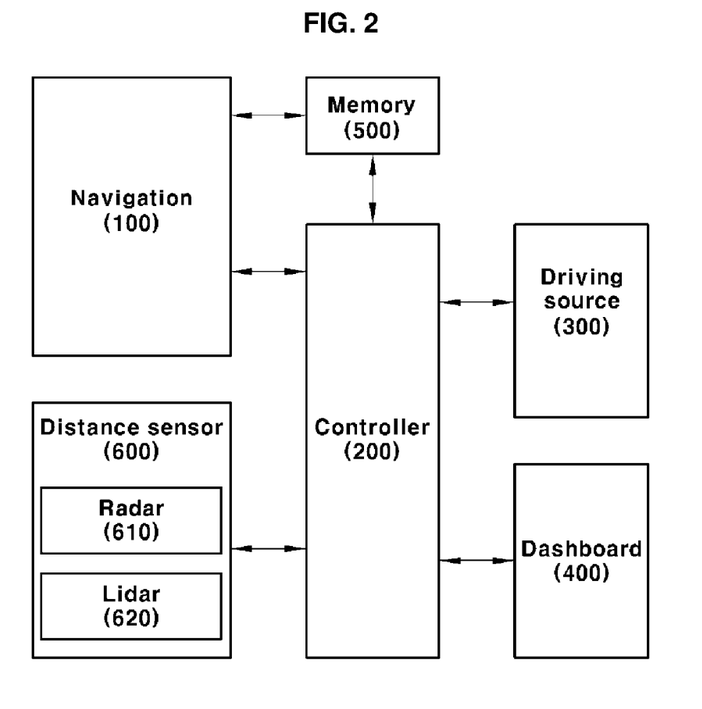
FIG. 2 is a block diagram illustrating a connection relation between components of an inertial driving guide apparatus according to an embodiment of the present disclosure.

The controller 200 includes all controllers which set a vehicle speed and route setting information and provide an inertial driving guide and control as well as the aforementioned HCU, MCU and BMS, and an electronic control unit (ECU).

In addition, creep torque configured to decrease the speed of the vehicle through the inertial driving guide of the present disclosure is one of the driving sources 300 and is provided by the motor, and the quantity of the creep torque applied for speed reduction is determined through the controller 200.

Further, a vehicle speed controlled through the inertial driving guide is set according to a map stored in the controller 200. The quantity of the creep torque may be different according to set map.

An inertial driving guide is information provided to a driver of a vehicle for inducing the driver not to accelerate the vehicle when a front vehicle deceleration event is generated so as to improve fuel efficiency. That is, the "inertial driving guide" is a function of receiving road analysis information from the navigation system 100 and indicating an accelerator (accelerator pedal) release timing on a dashboard 400 when a driving direction change or a deceleration situation such as entry into a tollgate is expected, thereby reducing unnecessary use of fuel and improving fuel efficiency.

Further, the inertial driving guide is configured to be displayed at a position recognizable by a user, such as a cluster positioned at the dashboard 400, audio video navigation (AVN), a display or a head up display (HUD).

The inertial driving guide apparatus of the present disclosure executes a function of indicating an accelerator pedal release timing through the dashboard 400 to guide inertial driving and improve efficiency when a deceleration situation is expected through a traveling route and road information of the navigation system 100.

In addition, when the driver releases the accelerator pedal according to the inertial driving guide, the speed of the vehicle is controlled in order to perform inertial driving. The controller 200 is configured to set a target vehicle speed and a target point in order to control inertial driving of the vehicle.

FIG. 2 is a block diagram of the inertial driving guide apparatus as an embodiment of the present disclosure.

As shown, the inertial driving guide apparatus of the present disclosure includes the navigation system 100 through which a destination of a vehicle is set and the controller 20 for setting a route according to the destination set through the navigation system 100.

The controller 200 may set a location at which the inertial driving guide is required according to the driving route set through the navigation system 100 and change a target vehicle speed and a target point for inertial driving, which are set depending on presence or absence of a preceding vehicle.

That is, the controller 200 may determine the location of a route on which inertial driving can be performed and set a control event (vehicle control for providing the inertial driving guide and inertial driving in a specific section, which is referred to as an event hereinafter) for reaching the target vehicle speed and the target point on a route on which inertial driving is required.

The event of the present disclosure includes an operation of determining a location on a traveling route, at which the inertial driving guide is required, and setting a target vehicle speed and a target point (point at which control is completed) of a vehicle according to an accelerator off state to perform inertial driving control.

Further, when a preceding vehicle is present during inertial driving control of the present disclosure, the speed of the preceding vehicle and the distance between the current vehicle and the preceding vehicle, which are vehicle information of the preceding vehicle, are compared to the speed of the current vehicle, and when a time in which the distance between the vehicles and a relative speed calculated using the speed of the preceding vehicle and the speed of the current vehicle have been reflected is less than a comparison value preset in the controller 200, a target point set according to inertial driving and a target vehicle speed when the vehicle passes the target point may be changed.

In particular, creep torque generated in the motor may be controlled to change a torque value applied to reduce the speed of the current vehicle in order to change the target point and the target vehicle speed.

That is, inertial driving control performed according to an accelerator off state is configured to control the current speed of a vehicle to decrease through at least part of creep torque generated in the accelerator off state, and when a preceding vehicle is present, set values of inertial driving control are changed in consideration of time in which a relative speed has been reflected.

Further, the inertial driving guide is set by the controller 200 such that it is provided at a distance preset according to a traveling route of a vehicle. In particular, the inertial driving guide may be configured to be displayed on the dashboard 400 or a display provided in a vehicle.

That is, the inertial driving guide apparatus of the present disclosure is configured to display the inertial driving guide at a distance preset on a traveling route and to perform inertial driving control when a driver releases the accelerator pedal while the inertial driving guide is maintained.

More desirably, the controller 200 of the present disclosure may control the speed of a vehicle according to an inertial driving guide event and perform speed control of the vehicle according to a controlled target speed.

The controller 200 of the present disclosure includes all of individual controllers for controlling a hybrid vehicle and includes all components capable of controlling a vehicle speed according to a traveling route set through the navigation system 100.

In addition, the controller 200 of the present disclosure includes a location recognition unit including a GPS, a gyro sensor, a geomagnetic sensor, an acceleration sensor and an inertial sensor for acquiring information necessary to position a vehicle, a display capable of receiving information in association with a camera and a distance sensor 600 (radar 610) and displaying traveling route information, and a memory 500 including map information.

The distance sensor 600 may sense external objects of a vehicle, for example, preceding vehicles traveling in front of the vehicle, roads, fixed objects including structures installed around roads, vehicles traveling in opposite lanes, etc.

Although the distance sensor 600 of a vehicle according to an embodiment of the present disclosure may include the radar 610 or light detection and ranging (lidar) 620, the distance sensor 600 may be implemented as the lidar 620 for accurate measurement.

The controller 200 includes the GPS, gyro sensor, acceleration sensor and inertial sensor and may further include a geomagnetic sensor.

The gyro sensor included in or operating in connection with the controller 200 of the present disclosure is called a gyroscope or an angular velocity sensor and detects rotation information of the corresponding vehicle. Specifically, the gyro sensor can detect a rotation rate and rotational displacement of a target to be detected using the law of conservation of angular momentum, the Sagnac effect and Coriolis force.

The controller 200 of the present disclosure is configured to set a traveling route in accordance with a destination set through the navigation system 100 and to operate in connection with sensors which are included therein and configured to measure various types of information such as a distance between vehicles, location of the corresponding vehicle, rotation information of the corresponding vehicle, and an angle of entry of the vehicle into a crossroad at a junction when the vehicle travels along the set traveling route.

In addition, the present disclosure includes the radar 610 or the lidar 620 through which presence or absence of a preceding vehicle, the speed of the preceding vehicle, and a distance between the current vehicle and the preceding vehicle can be measured when the current vehicle travels.

Figure 3:
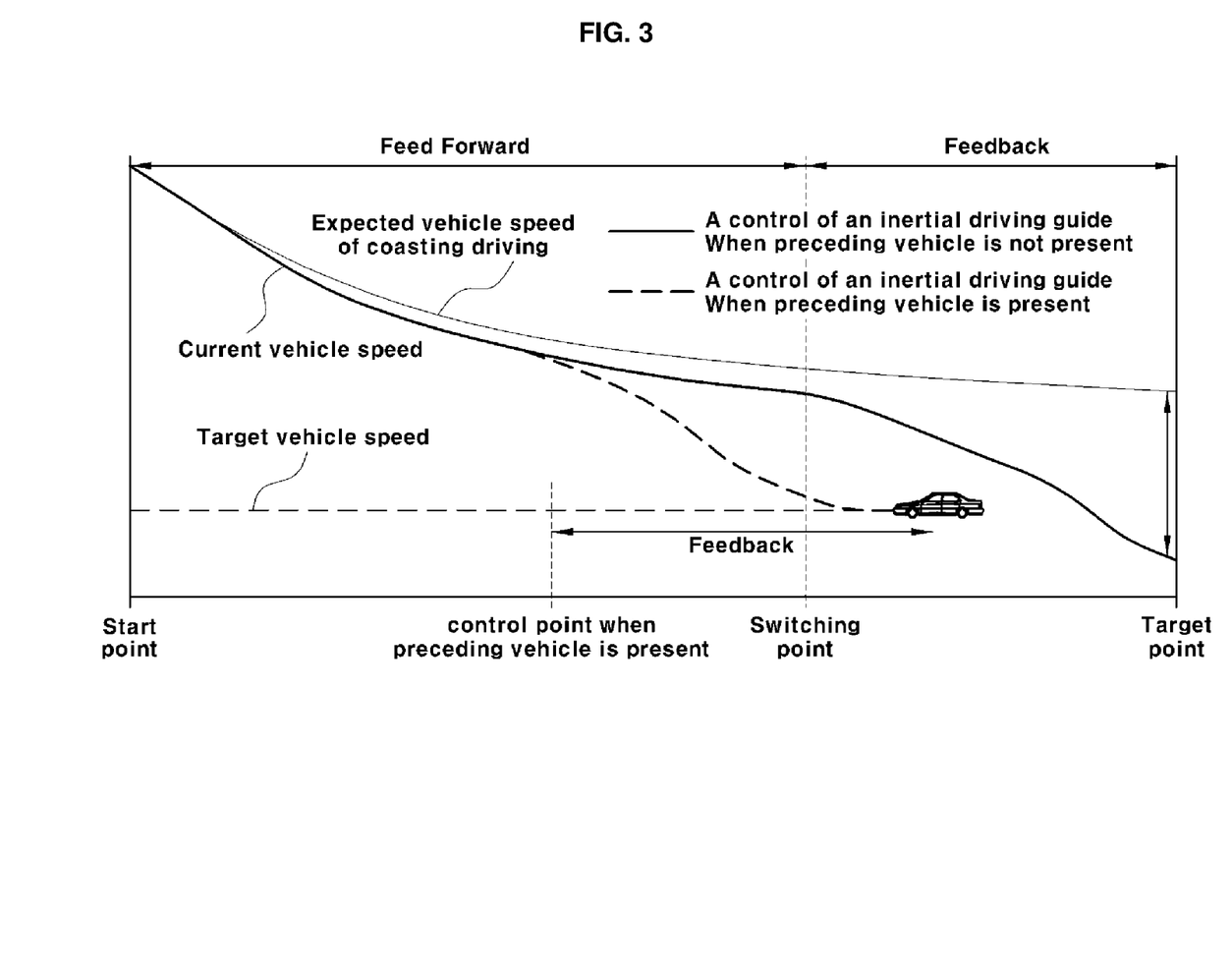
FIG. 3 illustrates control through the inertial driving guide apparatus when a preceding vehicle is present according to an embodiment of the present disclosure.

FIG. 3 illustrates an embodiment of the present disclosure, in which a target point and a target vehicle speed, which are set through inertial traveling guide, are changed when there is a preceding vehicle.

In an embodiment of the present disclosure, the radar 610 is used as a device for measuring a distance between the current vehicle and the preceding vehicle, and the distance between the current vehicle and the preceding vehicle, measured by the radar 610, is transmitted to the controller 200.

More desirably, the controller 200 which receives the distance between the current vehicle and the preceding vehicle may be configured as an HCU. The HCU is configured to determine whether information on the distance between the current vehicle and the preceding vehicle is valid and whether the target point and the target vehicle speed, which are set through inertial traveling guide, need to be changed on the basis of the preceding vehicle.

When a relative distance between the preceding vehicle and the current vehicle is $\delta S$, the speed of the preceding vehicle is V1, and the speed of the current vehicle is V, the controller 200 of the present disclosure is configured to change the target point and the target vehicle speed set for inertial driving control if $$\frac{\delta S}{V - V1}$$

is less than X (a comparison value) preset in the controller 200.

As described above, $$\frac{\delta S}{V - V1}$$

is defined as a time in which the relative time has been reflected in the present disclosure. When the time in which the relative time has been reflected is less than X stored in the controller 200, the target point is changed to a target point considering a distance margin a of the current vehicle. Specifically, when the location of the preceding vehicle is set to S1 and the location of the current vehicle is set to S, the distance between the vehicles is calculated as $\delta S = S - S1$, and when the distance margin a is considered, the target point is changed to $\delta S - a$.

In addition, the target vehicle speed is changed to V1-b by applying a speed margin b to the speed V1 of the preceding vehicle.

That is, the controller 200 is configured to change the target point and the target vehicle speed, which are set in order to provide the inertial driving guide, by applying the distance margin and the speed margin to the target distance and the target vehicle speed when the distance between the preceding vehicle and the current vehicle is less than the comparison value preset in the controller 200.

The distance margin and the speed margin used to change the target point and the target vehicle speed are margins for preventing collision with the preceding vehicle and may be changed according to setting.

In summary, when a preceding vehicle is present during operation of the inertial driving guide, $$\frac{\delta S}{V - V1}$$

is calculated in consideration of the distance between the preceding vehicle and the current vehicle and the speeds of the preceding vehicle and the current vehicle and compared with the comparison value X set in the controller 200, and when $$\frac{\delta S}{V - V1}$$

is less than the comparison value, the target point and the target vehicle speed set for an initial inertial driving guide are changed.

In addition, the target point and the target vehicle speed are changed to a new target point and target vehicle speed in consideration of the distance margin and the speed margin. As shown, when there is no preceding vehicle, a specific quantity of torque is additionally applied in addition to a previously applied creep torque when the driver releases the accelerator pedal, to thereby reduce the speed of the vehicle.

Feed forward control is maintained to a switching point, and the inertial driving guide is displayed through at least one of the cluster, AVN, display and HUD such that the driver can recognize that inertial driving is being performed.

Feedback control uses PI control depending on a difference between a target vehicle speed and a control vehicle speed and a distance between a target point and a current point. Accordingly, the current vehicle can be controlled to follow the target speed at the target point, as shown in FIG. 3.

A switching point at which feed forward control switches to feedback control refers to a time at which feed forward control switches to feedback control. Although the time may be determined by a developer, the time is determined depending on an event type and a target speed at a target point in the present disclosure.

On the other hand, when control is performed according to a preceding vehicle, the speed of the current vehicle is controlled through feedback control for control accuracy because the speed and location of the preceding vehicle continuously change.

Accordingly, when there is a preceding vehicle, a target vehicle speed and a target point are changed, feedback control is performed depending on a difference between the changed target vehicle speed and the current vehicle speed, and PI control is performed depending on a difference between the changed target point and the current location of the current vehicle.

When the current vehicle arrives at the target point through the above-described control, control is finished. More desirably, control is finished at a point corresponding to "target point set through inertial driving guide—distance margin a" when there is no preceding vehicle, whereas control is finished when the current vehicle arrives at δS−a when there is a preceding vehicle.

Figure 4:
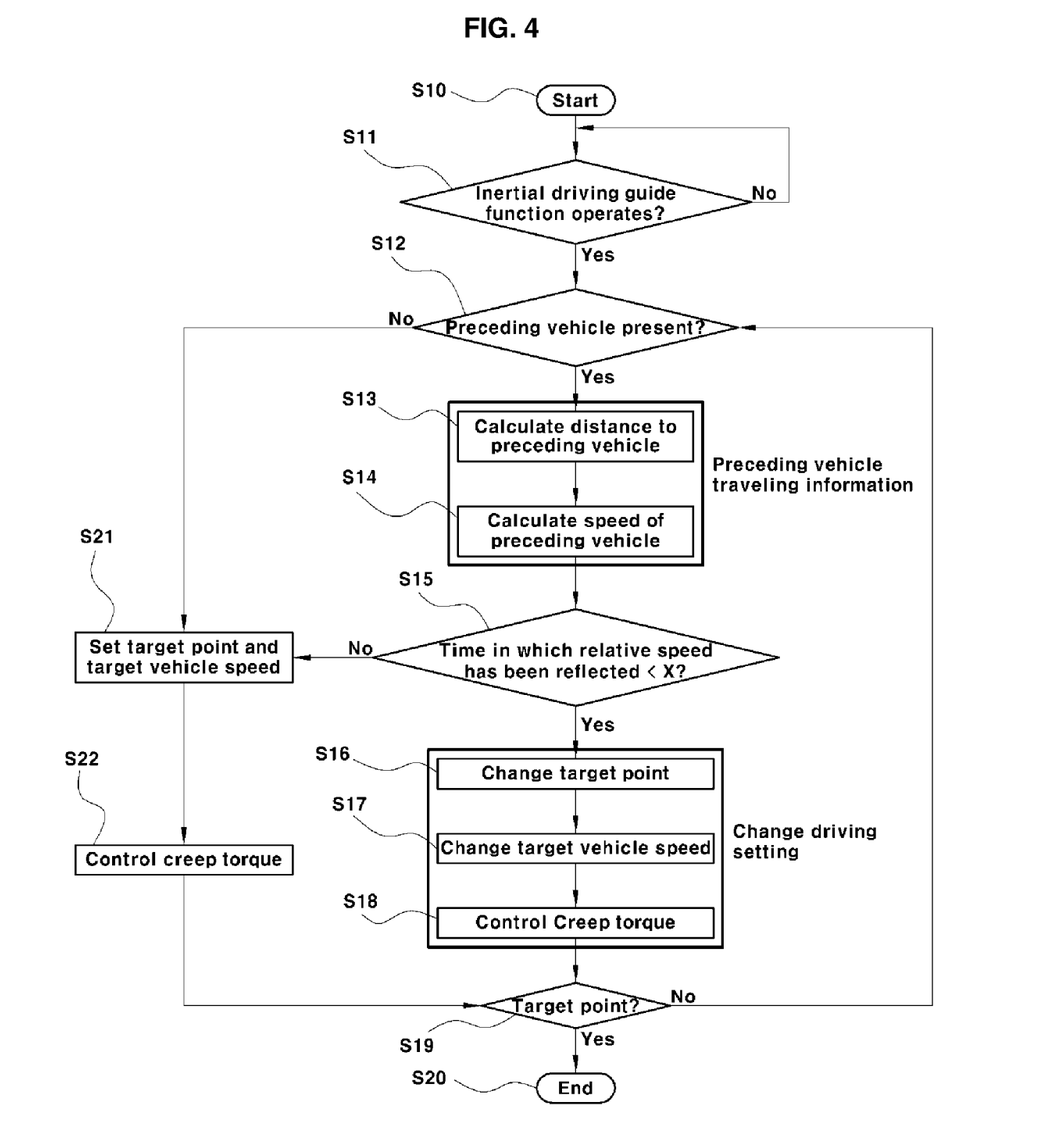
FIG. 4 is a flowchart illustrating an inertial driving control method when a preceding vehicle is present according to an embodiment of the present disclosure.

FIG. 4 is a flowchart illustrating an inertial driving guide control method according to an embodiment of the present disclosure.

When a destination is input through the navigation system 100, a traveling route is set and a logic is started (S10).

At a location at which the inertial driving guide is required on the traveling route, words of guidance for inertial driving are displayed through at least one of the cluster of the dashboard 400, the display, the AVN and the HUD (S11), and it is determined whether there is a preceding vehicle (S12).

When there is no preceding vehicle, a target point and a target vehicle speed are set through inertial driving control (S21). Creep torque is controlled to follow the set target point and target vehicle speed (S22), and it is determined whether the target point is reached (S19). When the target point is reached, the logic is ended (S20).

When there is a preceding vehicle, a distance between the preceding vehicle and the current vehicle is calculated (S13) and the speed of the preceding vehicle is calculated (S14).

It is determined whether $$\frac{\delta S}{V-V1}$$

defined as a time at which a relative speed between the preceding vehicle and the current vehicle has been reflected is less than the comparison value X stored in the controller 200 in consideration of the speed of the current vehicle on the basis of the distance between the preceding vehicle and the current vehicle and the speed of the preceding vehicle (S15).

If the time in which the relative speed has been reflected is greater than the comparison value, inertial driving is maintained to follow the initially set target point and target vehicle speed (S21).

The set target point is changed according to the inertial driving guide in a driving setting change step (S16), the target vehicle speed is changed (S17) and the creep torque is controlled (S 18) to control the speed of the current vehicle.

Thereafter, when a target point changed through vehicle speed control is reached (S19), the logic is ended (S20).

The disclosure has been described in detail with reference to preferred embodiments thereof. However, it will be appreciated by those skilled in the art that the present disclosure may be implemented in various modifications and alterations via, for example, addition, change or omission of constituent elements without departing from the principles and spirit of the disclosure, and these modifications and alterations are within the scope of the present disclosure.

In addition, in the description of the embodiments of the present disclosure, a detailed description of known functions and configurations incorporated herein is omitted when it may make the subject matter of the present disclosure rather unclear. In addition, the terms used in the above description are defined in consideration of the functions in the embodiments of the present disclosure, and may be replaced by other terms based on intentions of users or operators, customs, or the like. Hence, the meanings of these terms should be based on the whole content of this specification. Accordingly, the above detailed description of the present disclosure is not intended to limit the present disclosure to the disclosed embodiments, and the accompanying claims should be construed as including other embodiments.

What is claimed is:

1. An inertial driving guide apparatus, comprising:
   a navigation system configured to output a traveling route according to an input of a destination of a current vehicle; and
   a controller for providing an inertial driving guide for the current vehicle according to current traveling road conditions depending on the input route,
   wherein, if a preceding vehicle is present in front of the current vehicle when the inertial driving guide for the current vehicle is performed, the controller is configured to compare vehicle information on the preceding vehicle with vehicle information on the current vehicle and to change a driving setting for inertial driving of the current vehicle, and
   wherein the driving setting includes a target point and a target vehicle speed set for the inertial driving guide.

2. The inertial driving guide apparatus of claim 1, wherein the vehicle information on the preceding vehicle, measured by the controller, includes a distance between the current vehicle and the preceding vehicle and a speed of the preceding vehicle.

3. The inertial driving guide apparatus of claim 1, wherein the controller changes the speed of the current vehicle according to the changed driving setting by controlling creep torque.

4. The inertial driving guide apparatus of claim 3, wherein the controller performs feedback control in order to control the creep torque.

5. The inertial driving guide apparatus of claim 1, wherein the controller changes the driving setting when a time at which a relative speed of the current vehicle and the preceding vehicle has been reflected is less than a preset value.

6. An inertial driving guide control method, comprising:
   outputting a traveling route, by a navigation system, when a destination of a current vehicle is input to a navigation system;
   determining, by a controller, whether an inertial driving guide for the current vehicle along the traveling route is required;
   determining, by the controller, whether there is a preceding vehicle in front of the current vehicle when the inertial driving guide for the current vehicle is required;
   comparing, by the controller, vehicle information on the preceding vehicle with vehicle information on the current vehicle when there is the preceding vehicle in front of the current vehicle; and changing, by the controller, a driving setting for inertial driving of the current vehicle when a result of a comparison between the vehicle information on the current vehicle and the vehicle information on the preceding vehicle is less than a comparison value preset in the controller, wherein the driving setting includes a target point and a target vehicle speed set for the inertial driving guide.

7. The inertial driving guide control method of claim 6, wherein the vehicle information on the preceding vehicle includes a distance between the current vehicle and the preceding vehicle and a speed of the preceding vehicle.

8. The inertial driving guide control method of claim 6, wherein the controller changes the speed of the current vehicle according to the changed driving setting by controlling creep torque.

9. The inertial driving guide control method of claim 8, wherein the controller performs feedback control in order to control the creep torque.

10. The inertial driving guide control method of claim 6, wherein in comparing the vehicle information on the preceding vehicle with the vehicle information on the current vehicle when the preceding vehicle is present, the driving setting is changed when a time at which a relative speed of the current vehicle and the preceding vehicle has been reflected is less than the preset value.

* * * * *